United States Patent
Lee et al.

(10) Patent No.: US 10,983,401 B2
(45) Date of Patent: Apr. 20, 2021

(54) LIQUID CRYSTAL DISPLAY PANEL HAVING THREE TRANSPARENT CONDUCTIVE LAYERS FOR FORMING ELECTRIC FIELDS

(71) Applicant: Innolux Corporation, Miao-Li County (TW)

(72) Inventors: Hsin-Yu Lee, Miao-Li County (TW); Ching-Che Yang, Miao-Li County (TW); Chen-Kuan Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/154,819

(22) Filed: Oct. 9, 2018

(65) Prior Publication Data

US 2019/0041704 A1 Feb. 7, 2019

Related U.S. Application Data

(63) Continuation of application No. 14/983,625, filed on Dec. 30, 2015, now abandoned.
(Continued)

(30) Foreign Application Priority Data

Nov. 30, 2015 (CN) .......................... 201510859260.9

(51) Int. Cl.
*G02F 1/1343* (2006.01)
*G02F 1/139* (2006.01)
(Continued)

(52) U.S. Cl.
CPC ...... *G02F 1/134309* (2013.01); *G02F 1/1393* (2013.01); *G02F 1/133365* (2013.01);
(Continued)

(58) Field of Classification Search
CPC combination set(s) only.
See application file for complete search history.

(56) References Cited

U.S. PATENT DOCUMENTS

| 6,577,368 B1 * | 6/2003 | Yuh | G02F 1/134363 349/141 |
|---|---|---|---|
| 7,940,359 B2 | 5/2011 | Lee | |

(Continued)

FOREIGN PATENT DOCUMENTS

| CN | 1688920 A | 10/2005 |
|---|---|---|
| CN | 101706620 A | 5/2010 |

(Continued)

OTHER PUBLICATIONS

CN Office Action dated Jan. 30, 2019 in Chinese application (No. 201510859260.9).
(Continued)

*Primary Examiner* — Lauren Nguyen
(74) *Attorney, Agent, or Firm* — McClure, Qualey & Rodack, LLP

(57) ABSTRACT

A display panel includes a first substrate, a second substrate opposite to the first substrate, and a liquid crystal layer positioned between the first substrate and the second substrate. The first substrate includes a first base plate, plural scan lines and plural data lines formed on the first base plate and intersected each other, wherein two adjacent scan lines and two adjacent data lines define a pixels region. Each pixel region includes a first transparent conductive layer formed above the first base plate, an insulating layer formed on the first transparent conductive layer, and a second transparent conductive layer formed on the insulating layer. The second substrate includes a second base plate and a third transparent conductive layer formed on the second base plate.

12 Claims, 11 Drawing Sheets

Related U.S. Application Data

(60) Provisional application No. 62/108,560, filed on Jan. 28, 2015.

(51) Int. Cl.
  *G02F 1/1333* (2006.01)
  *G02F 1/137* (2006.01)

(52) U.S. Cl.
  CPC ............ *G02F 1/134363* (2013.01); *G02F 2001/13775* (2013.01); *G02F 2001/134372* (2013.01)

(56) References Cited

U.S. PATENT DOCUMENTS

| | | | |
|---|---|---|---|
| 8,045,099 | B2 | 10/2011 | Tashiro et al. |
| 2005/0024548 | A1 | 2/2005 | Choi et al. |
| 2007/0070282 | A1* | 3/2007 | Shibahara ......... G02F 1/134363 349/141 |
| 2008/0007666 | A1* | 1/2008 | Takeda ................ G02F 1/0045 349/43 |
| 2012/0154730 | A1* | 6/2012 | Sakurai ............ G02F 1/134363 349/141 |
| 2015/0070644 | A1* | 3/2015 | Lee .................. G02F 1/134309 349/142 |

FOREIGN PATENT DOCUMENTS

| | | |
|---|---|---|
| CN | 102692769 A | 9/2012 |
| CN | 102841466 A | 12/2012 |

OTHER PUBLICATIONS

SIPO Office Action dated Sep. 13, 2018 in Chinese application (No. 201510859260.9).

\* cited by examiner

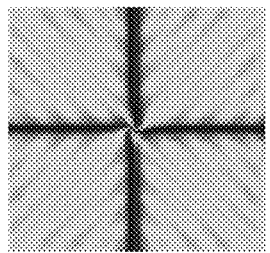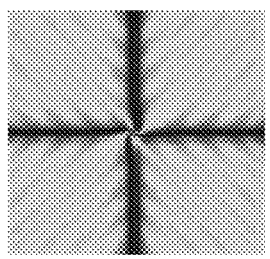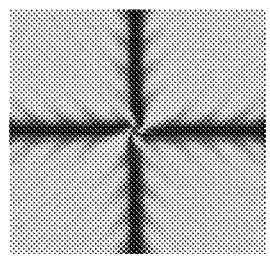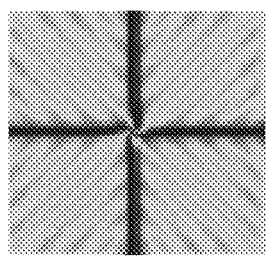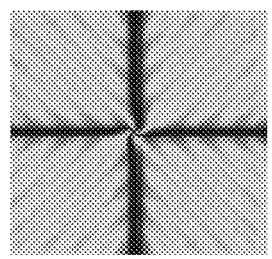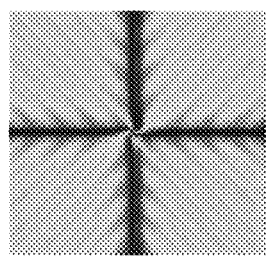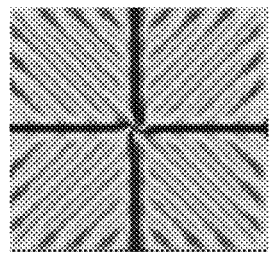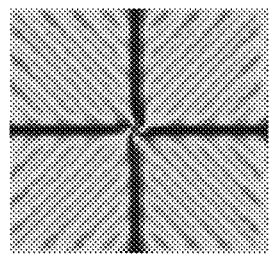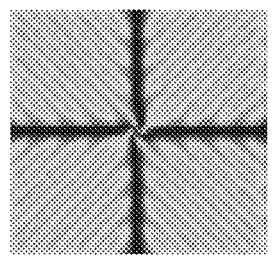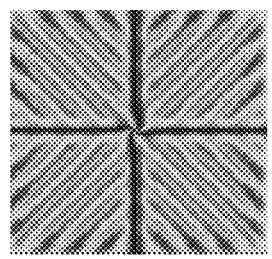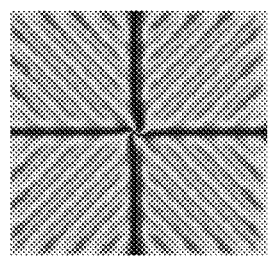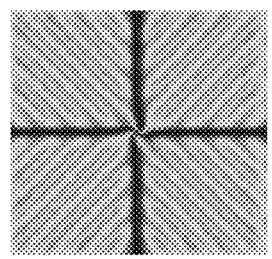
FIG. 11A  FIG. 11B  FIG. 11C  FIG. 11D  FIG. 11E  FIG. 11F
FIG. 11G  FIG. 11H  FIG. 11I  FIG. 11J  FIG. 11K  FIG. 11L

LIQUID CRYSTAL DISPLAY PANEL HAVING THREE TRANSPARENT CONDUCTIVE LAYERS FOR FORMING ELECTRIC FIELDS This is a continuation application of application Ser. No. 14/983,625, filed Dec. 30, 2015, which claims the benefit of U.S. Provisional Application No. 62/108,560, filed Jan. 28, 2015, and the benefit of People's Republic of China Application No. 201510859260.9, filed Nov. 30, 2015, the subject matters of which are incorporated herein by reference.

BACKGROUND

Field of the Invention

The disclosure relates in general to a display panel, and more particularly to a liquid crystal display panel.

Description of the Related Art

Today, electronic products with display panels, such as smart phones, tablet personal computers (i.e. tablet PC, flat PC, ex: iPad), laptops, monitors, and televisions, are necessary tools for work and leisure in the daily life. Liquid crystal display (LCD) panel is the most popular display panel in use.

For a LCD panel applicable to a flat display, an electronic visual display and an image display, the liquid crystal molecules aligned between two transparent electrodes rotate continuously depending on the polarity and magnitude of the electric field when the electric field is applied, and different grey scale expression can be adjusted and realized by varying the applied voltage. LCD panel possesses the excellent characteristics such as compact in size, light weight, easy to carry, having reasonable price, higher display quality and operation reliability. Also, viewer's eyes feel much more comfortable looking at a LCD panel. Older cathode ray tube (CRT) monitors have been replaced by LCD panels. Currently, LCD panels provide a versatile choice in sizes, shapes and resolutions for the consumers. However, the quality of the display panel would be affected by the variations of the processes. It is important to consider not only the details in the manufacturing procedures, but also the electrical performances and reliability meeting the requirements of the product. For example, a qualified display panel should have excellent electrical characteristics such as high transmittance, high production yield, high operation reliability and stable displaying quality. However, the variations of the processes may have considerable effect on those electrical characteristics as well as the displaying quality.

SUMMARY

The disclosure is directed to a display panel having better displaying quality, and the variations of the processes have slighter considerable effect on the electrical performances of the display panel. Accordingly, the display panel of the embodiment has stable displaying quality, thereby increasing the production yield.

According to one embodiment of the disclosure, a display panel is provided, comprising a first substrate, a second substrate opposite to the first substrate, and a liquid crystal layer positioned between the first substrate and the second substrate. The first substrate comprises a first base plate, plural scan lines and plural data lines formed on the first base plate and intersected each other, wherein two adjacent scan lines and two adjacent data lines define a pixels region. Each pixel region comprises a first transparent conductive layer formed on the first base plate, an insulating layer formed on the first transparent conductive layer, and a second transparent conductive layer formed on the insulating layer. The second substrate comprises a second base plate and a third transparent conductive layer formed on the second base plate.

The above and other aspects of the disclosure will become better understood with regard to the following detailed description of the preferred but non-limiting embodiments. The following description is made with reference to the accompanying drawings.

BRIEF DESCRIPTION OF THE DRAWINGS

FIG. 11A-FIG. 11F show EMS photos of 3-electrode designs in Table 1.

FIG. 11G-FIG. 11L show EMS photos of comparisons in Table 1.

DETAILED DESCRIPTION

Figure 1:
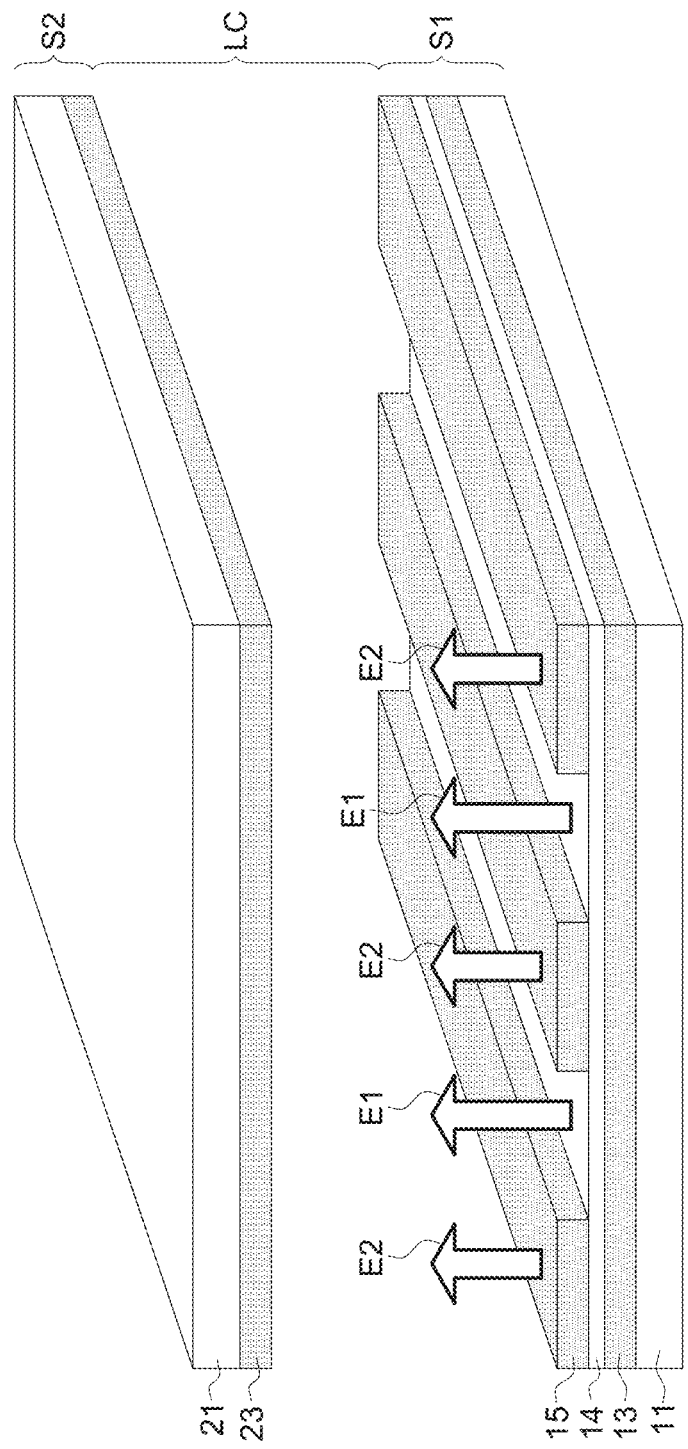
FIG. 1 illustrates a PSVA mode LCD panel according to the first embodiment of the present disclosure.

In the embodiment of the present disclosure, a display panel is disclosed by providing a electrode design to improve the transmittance and have stable displaying quality. Also, the result of stable displaying quality is not affected easily by the variations in manufacturing processes. Accordingly, the production yield of the display panel manufactured by the design of the embodiment is increased. Moreover, the display panel adopted the electrode design of the embodiment has good electrical and structural characteristics such as high aperture ratio to meet the requirements of the products in the application. Also, the manufacture of electrode design of the embodiment is highly compatible with the current processes. Accordingly, the design of the embodiment not only makes the display panel as manufactured possess excellent and stable displaying quality, but also is suitable for mass production.

Several embodiments are described in details with reference to the accompanying drawings. The embodiment of the present disclosure can be applied to a polymer stabilization vertical-alignment (PSVA) mode liquid crystal display (LCD) panel. It is noted that not all embodiments of the invention are shown. The details of the structures of the embodiments are provided for exemplification, and the described details of the embodiments are not intended to limit the present disclosure. Modifications and variations can be made without departing from the spirit of the disclosure to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense. Also, the identical and/or similar elements of the embodiments are designated with the same and/or similar reference numerals.

Moreover, use of ordinal terms such as "first", "second", "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

First Embodiment

FIG. 1 illustrates a PSVA mode LCD panel according to the first embodiment of the present disclosure. A display panel includes a first substrate S1, a second substrate S2 disposed oppositely to the first substrate S1, and a liquid crystal layer LC disposed between the first substrate S1 and the second substrate S2. For example, the first substrate S1 and the second substrate S2 are a TFT substrate and a CF substrate, and this structure is taken for illustrating the related configuration of the embodiment. However, the disclosure is not limited to this structure and illustrated details.

In one embodiment, the first substrate S1 comprises a first base plate 11, a first transparent conductive layer 13 formed on the first base plate 11, an insulating layer 14 formed on the first transparent conductive layer 13, and a second transparent conductive layer 15 formed on the insulating layer 14, as shown in FIG. 1. The first substrate S1 also comprises a plurality of transistors, and a plurality of patterned traces (such as the gate lines and the data lines) formed on the first base plate 11 according to the pixel design. A patterned indium tin oxide (ITO) layer (having several slits) can be implemented as the second transparent conductive layer 15, which functions as the pixel electrode. According to the embodiment, the first transparent conductive layer 13 is positioned below the second transparent conductive layer 15, and separated from the second transparent conductive layer 15 by the insulating layer 14. In the first embodiment, the first transparent conductive layer 13 is a full ITO film, which can be applied in a TN mode LCD having an ITO film without forming fine slits. According to the configuration of the first substrate S1 as described above, the first transparent conductive layer 13 can be referred as a middle ITO (hereinafter referred to as "MITO"), and the second transparent conductive layer 15 can be referred as a top ITO (hereinafter referred to as "TITO"). Moreover, use of ordinal term such as "on" in the specification and claims refers to the related element/layer positioned above, and the related elements/layers stacked vertically can be directly contact to each other, or other elements/layers can be added therebetween.

The second substrate S2 opposite to the first substrate S1 comprises a second base plate 21 and a third transparent conductive layer 23 formed on the second base plate 21. In one embodiment, the third transparent conductive layer 23 is a full ITO film. Other elements of the second substrate S2 known to people skilled in the art, such as the light shielding layer (black matrix), the color resist layer, other protective layers and the spacers, have been omitted and not depicted in FIG. 1. Take the spacers for example, the spacers maintains the cell gap between the first substrate S1 and the second substrate S2 in a uniformed distance, and the cell gap is filled with the LC molecules of the LC layer. The details of the positions and functions of those known layers and elements are not redundantly described herein.

In the first embodiment, the first transparent conductive layer 13 can be electrically connected to the second transparent conductive layer 15. When the display panel is operated (i.e. an external electric field is applied to the LC layer), the same voltage is applied to the first transparent conductive layer 13 and the second transparent conductive layer 15, wherein a first vertical electric field E1 is generated between the first transparent conductive layer 13 and the third transparent conductive layer 23 and a second vertical electric field E2 is generated between the second transparent conductive layer 15 and the third transparent conductive layer 23. In the PSVA mode LCD panel, the tilt directions of the LC molecules are determined by the pattern of the second transparent conductive layer 15 (ex: the pixel ITO pattern), and the LC molecules are reoriented and aligned along the direction of the electric field (the electric field has the electric force on the LC molecules). According to the electrode design of the embodiment, the electric field intensity of the display panel can be significantly improved, thereby increasing the orientation force in the vertical direction upon the LC molecules. Thus, the display panel applied with the embodied electrode design possesses better operating characteristics such as a faster response time and a higher transmittance.

Figure 2A:
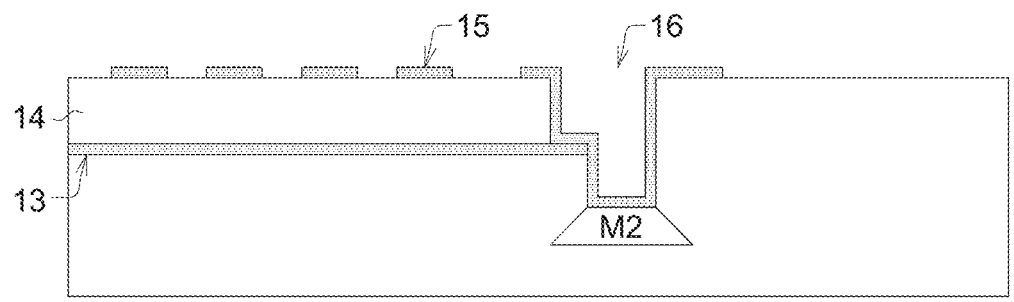
FIG. 2A to FIG. 2C are cross-sectional views of three different applicable configurations of the MITO and the TITO in the display panel of the first embodiment.
Figure 2B:
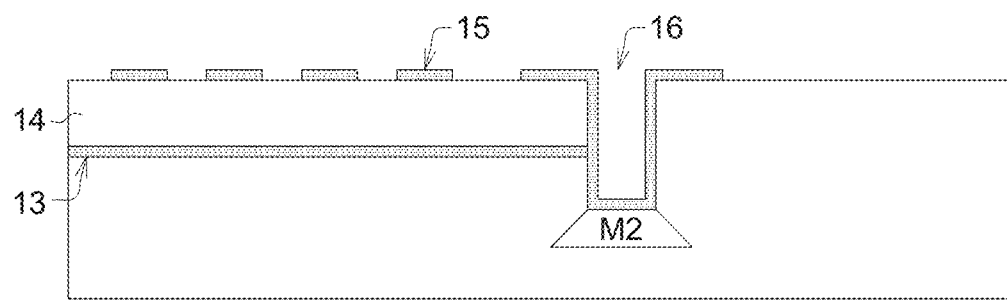
Figure 2C:
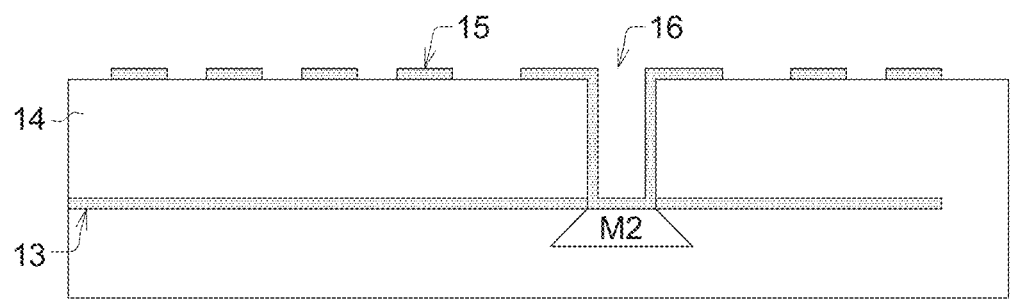

There are several ways to electrically connect the first transparent conductive layer 13 and the second transparent conductive layer 15, and three different ways are exemplified below for illustration. Please refer to FIG. 2A to FIG. 2C, which are cross-sectional views of three different applicable configurations of the MITO and the TITO in the display panel of the first embodiment. The second transparent conductive layer 15 on the insulating layer 14 can be electrically connected to the patterned second metal layer M2 (defining the source and drain regions) by the contact hole 16. The first transparent conductive layer 13 under the insulating layer 14 can be electrically connected to the second transparent conductive layer 15 by the contact hole 16 (as shown in FIG. 2A and FIG. 2B). Alternatively, the first transparent conductive layer 13 can be connected to the patterned second metal layer M2 for achieving electrical connection to the second transparent conductive layer 15 (as shown in FIG. 2C). It is noted that other layers and elements constructed between the patterned second metal layer M2 and the base plate, such as the patterned first metal layer, the gate insulating layer, the active layer and other protective layers, are not depicted in FIG. 2A to FIG. 2C. The configurations of those layers and elements (including TFT) are known to skilled people in the art, which are not redundantly described herein.

Figure 3:
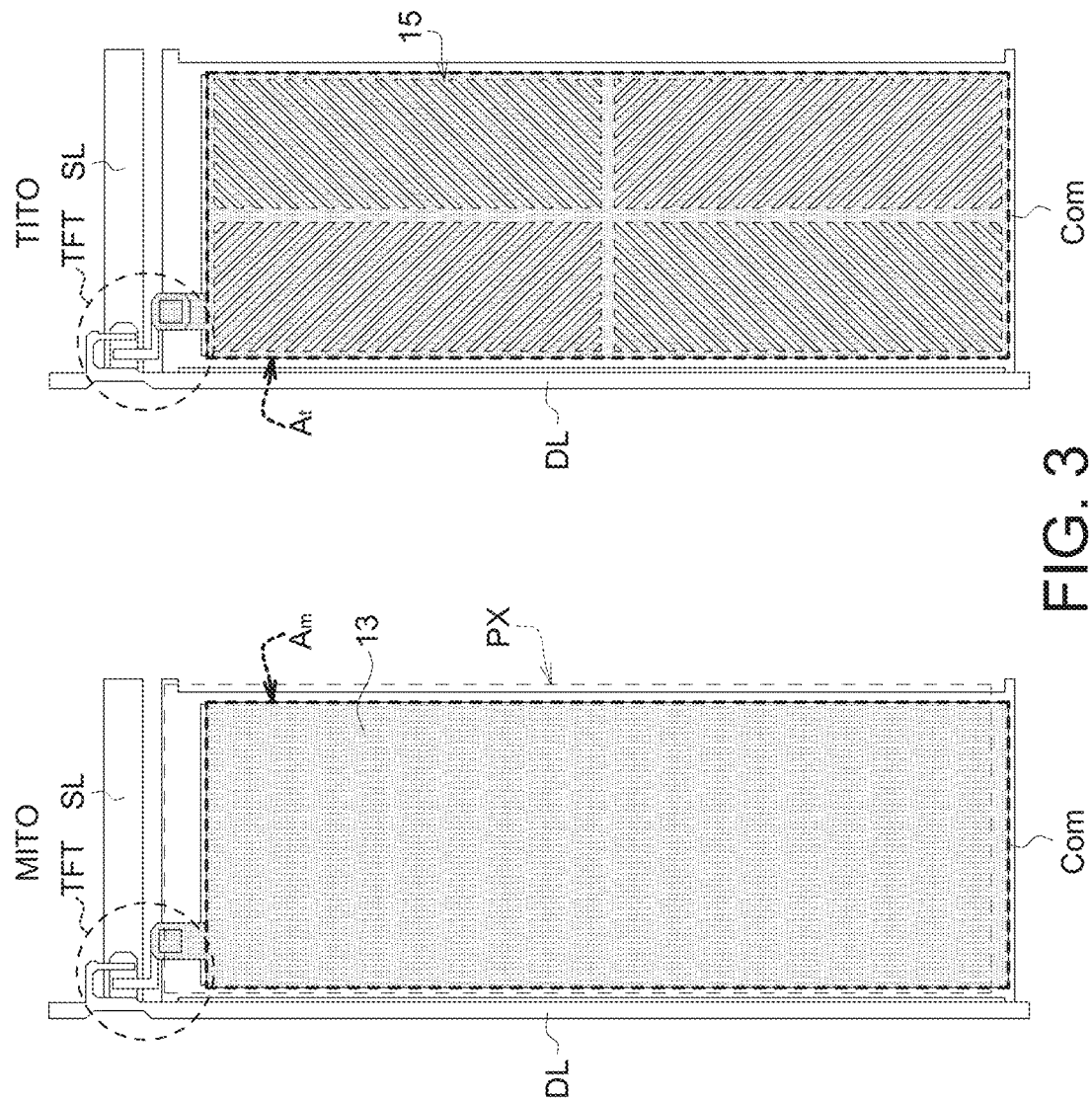
FIG. 3 depicts top views of an MITO pattern and a TITO pattern in a single pixel region of a display panel according to the first embodiment of the disclosure.

FIG. 3 depicts top views of an MITO pattern and a TITO pattern in a single pixel region of a display panel according to the first embodiment of the disclosure. The first substrate S1 comprises a plurality scan lines SL and the data lines DL formed on the first base plate 11 and intersected each other, wherein two of the adjacent scan lines and two of the adjacent data lines define a pixels region PX. The thin film transistor TFT, functioning as a switch to control the pixel region PX, is disposed adjacent to the intersection between the scan line SL and the data line DL, and is electrically connected to the data line DL. The pixel region PX may further include the trace Com applied with a common voltage, which is able to maintain or increase the uniformity of common voltage as applied to the display panel, and this is especially useful for the large-size display panels. Although the trace Com is depicted in FIG. 3, it is noted that the embodied design is applicable to any pixel region PX of the display panel with or without forming the trace Com.

As shown in FIG. 3, the MITO film (i.e. the first transparent conductive layer 13) is a full ITO film, and the TITO film (i.e. the second transparent conductive layer 15) is a patterned ITO film with several slits. The MITO and the TITO films electrical connected to each other are controlled by the TFT. Also, in the first embodiment, the coverage area $A_m$ of the MITO film (i.e. the first transparent conductive layer 13) is substantially equal to the coverage area $A_t$ of the TITO film (i.e. the second transparent conductive layer 15). The coverage area $A_m$ of the MITO film (i.e. the first transparent conductive layer 13) is close to or substantially equal to the area of the pixel region PX.

Figure 4A:
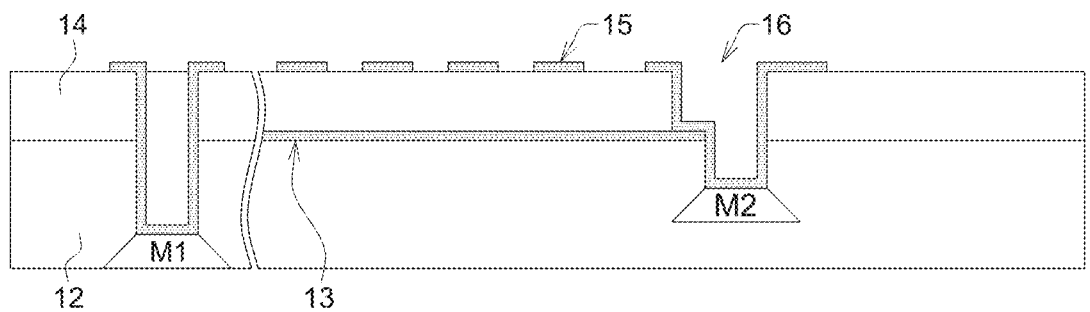
FIG. 4A and FIG. 4B illustrate a single insulating layer and a multi-layer insulation positioned between the first transparent conductive layer and the second transparent conductive layer, respectively.
Figure 4B:
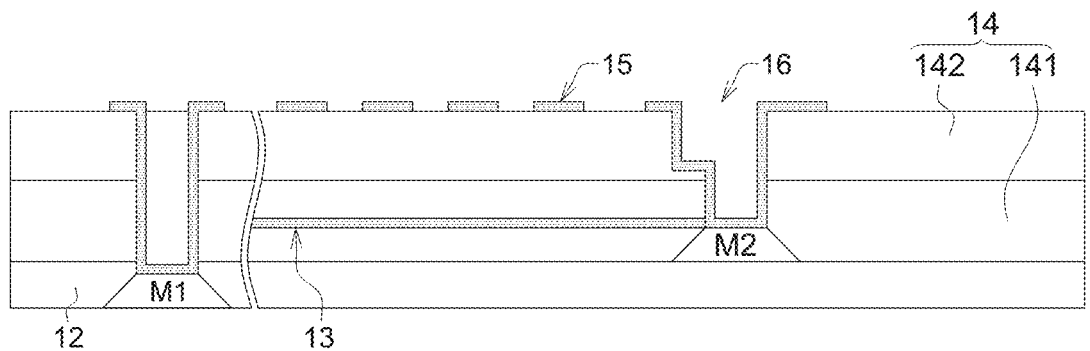

Also, the insulating layer 14 of the embodiment can be a single insulating layer or a multi-layer insulation. The multi-layer insulation may comprise several inorganic insulating layers, or a stack comprising alternated inorganic and organic material insulating layers. FIG. 4A and FIG. 4B illustrate a single insulating layer and a multi-layer insulation positioned between the first transparent conductive layer and the second transparent conductive layer, respectively. As shown in FIG. 4A, the insulating layer 14 positioned between the full MITO film (i.e. the first transparent conductive layer 13) and the patterned TITO film (i.e. the second transparent conductive layer 15) is an inorganic material insulating layer. In one embodiment, the thickness of the inorganic material insulating layer can be in a range of 1000 Å to 4000 Å. In another embodiment, the thickness of the inorganic material insulating layer can be in a range of 1500 Å to 2500 Å. However, the disclosure is not limited to those numerical values in those provided range. The thickness of the insulating layer 14 can be adjusted and selected according to the requirements of the practical application, so that the distance between the first transparent conductive layer 13 and the second transparent conductive layer 15 would be neither too large for affecting performance of the first transparent conductive layer 13 nor too small for affecting performance of the second transparent conductive layer 15. The thickness of another insulating layer 12 positioned under the full MITO film (i.e. the first transparent conductive layer 13) can be in a range of 2000 Å to 5000 Å, and the disclosure is not limited to thereto. Similarly, the thickness of the insulating layer 12 can be adjusted and selected according to the requirements of the practical application. Also, the insulating layers 12 and 14 can be made of the same inorganic material or different inorganic materials, such as SiOx, SiNx or other applicable materials.

Additionally, as shown in FIG. 4B, the insulating layer 14 positioned between the full MITO film (i.e. the first transparent conductive layer 13) and the patterned TITO film (i.e. the second transparent conductive layer 15) is a multi-layer insulation, which comprises at least one organic material insulating layer 141 and at least one inorganic material insulating layer 142. The organic material insulating layer 141 could be a single organic layer or multiple organic layers. In one embodiment, the inorganic material insulating layer 142 has a thickness in a range of 1000 Å to 4000 Å, or 1500 Å to 2500 Å, while the organic material insulating layer 141 has a thickness in a range of 8000 Å to 30000 Å. It is noted that the disclosure is not limited to those materials and numerical values in those provided ranges. Other organic or inorganic materials can be adopted and combined by selecting appropriate thickness of the insulating layer 14. Moreover, in one application, the cell gap (filled with the LC molecules) between the first substrate S1 and the second substrate S2 is in the range of 260 nm to 360 nm, the pitch of the patterned TITO film is in the range of 4 μm to 11 μm, the slit width of the patterned TITO film is in the range of "pitch-2" to "pitch/4". Noted that those numerical values as provided are merely for illustration, not for limitation.

Accordingly to the descriptions above, the design of the disclosure increases the intensity of the vertical electric field and the orientation force in the vertical direction upon the LC molecules, thereby increasing the transmittance of the pixel region. Moreover, the configuration of the three electrodes (i.e. the first transparent conductive layer 13/the second transparent conductive layer 15/the third transparent conductive layer 23) of the embodiment does significantly improve the display quality of the display panel, wherein the stability of the display quality are not affected by the process variations, thereby increasing the production yield of the display panel.

Several simulation tests are conducted to investigate the designs of three electrode, including setting or not setting the first transparent conductive layer 13, changing the cell gap between the substrates, adjusting the parameters such as the jag width and slit width of the electrode branch of the second transparent conductive layer 15. Also, the transmittance of the pixel region is observed and measured. Results of simulation tests are provided in Table 1.

TABLE 1

| Cell gap (μm) | 3.25 | | | 3.5 | | |
|---|---|---|---|---|---|---|
| jag width/slit width of the electrode branch (μm) | 4/3 | 3.5/3.5 | 3/4 | 4/3 | 3.5/3.5 | 3/4 |
| CF/TFT voltage | 0 V/8 V | | | | | |
| Transmittance of 3-electrode design of embodiment (T %) | 19.79% | 19.87% | 19.87% | 19.89% | 20.06% | 20.15% |
| EMS photos of 3-electrode design | FIG. 11A | FIG. 11B | FIG. 11C | FIG. 11D | FIG. 11E | FIG. 11F |

TABLE 1-continued

| Transmittance of comparison (T %) | 18.60% | 17.78% | 16.59% | 19.35% | 18.93% | 18.09% |
|---|---|---|---|---|---|---|
| EMS photos of comparison | FIG. 11G | FIG. 11H | FIG. 11I | FIG. 11J | FIG. 11K | FIG. 11L |
| Gain percentage of transmittance (T gain %) | 6.435% | 11.780% | 19.780% | 2.765% | 5.994% | 11.377% |

CF/TFT voltage: voltage applied to the second substrate/voltage applied to the first substrate.
Gain percentage of transmittance (T gain %) = [(transmittance of 3-electrode design/transmittance of comparison) − 1]*100%.

The simulation results have indicated that all of the transmittances of three-electrode design (19.79%, 19.87%, 19.87%, 19.89%, 20.06%, 20.15% from left to right) are higher than the transmittances (18.60%, 17.78%, 16.59%, 19.35%, 18.93%, 18.09% from left to right) of the comparison (i.e. setting the second transparent conductive layer 15 and the third transparent conductive layer 23, but not setting the first transparent conductive layer 13). Also, the simulation results have indicated that the transmittances of three-electrode design are significantly improved, and even up to 19.780%.

Moreover, all of the transmittances of three-electrode design according to the simulation results are higher than 19% and the differences are pretty small, no matter what the cell gap is 3.5 μm or 3.25 μm and what adjustments of the jag width and slit width of the electrode branch. Compared to the simulated transmittance results of the comparison, the transmittance results of three-electrode design are relatively stable. Accordingly, simulation results have proven that the three-electrode design of the embodiment does increase the transmittance of pixel region, and the process variations have no considerable effects on the transmittance.

Besides the advantages mentioned above, the display panel manufactured by the three-electrode design of the embodiment still can meet the general requirements of the application products such as high aperture ratio. Also, the manufacture of electrode design of the embodiment is highly compatible with the current processes. Accordingly, the production yield of the display panel manufactured by the three-electrode design of the embodiment can be increased.

Second Embodiment

Figure 5C:
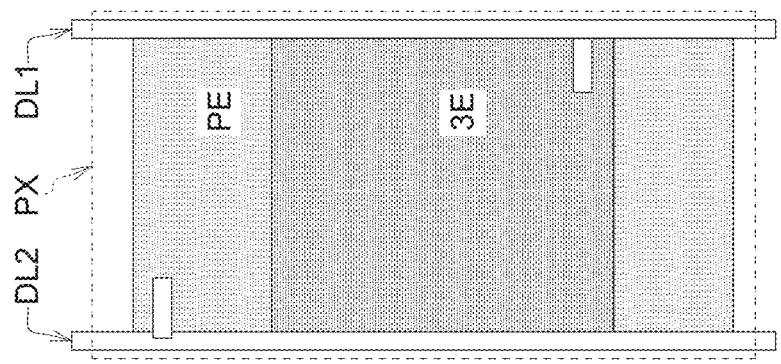
FIG. 5B and FIG. 5C illustrate a single pixel region of a LCS mode LCD panel according to the second embodiment of the present disclosure, respectively.
Figure 5B:
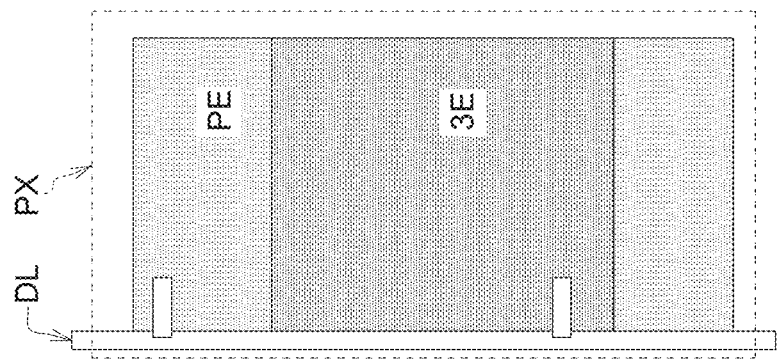
Figure 5A:
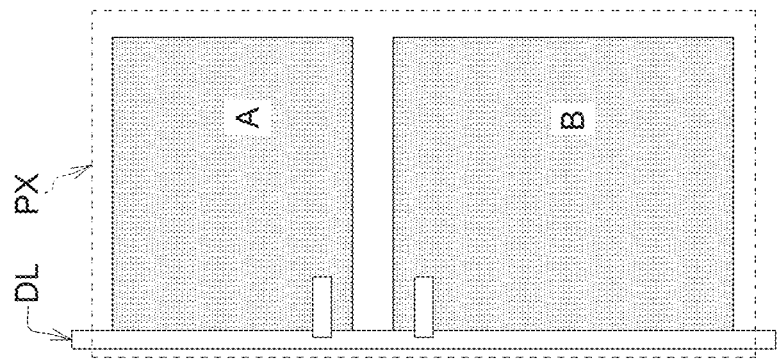
FIG. 5A illustrates a single pixel region of a convention LCS mode LCD panel.

This disclosure can be applied to a low color shift (LCS) mode LCD panel. Please refer to FIG. 5A, which illustrates a single pixel region of a convention LCS mode LCD panel. As shown in FIG. 5A, there is a bright region A and a dark region B in each pixel region for compensating the color shifting when the display panel is viewed from the side. In the second embodiment, the bright region and the dark region in each pixel region of the LCS mode LCD panel are created by partially overlapping the upper and lower electrodes. FIG. 5B and FIG. 5C illustrate a single pixel region of a LCS mode LCD panel according to the second embodiment of the present disclosure, respectively. Please refer to FIG. 1 and related descriptions above for the three-electrode design (i.e. configuration of the first transparent conductive layer 13/the second transparent conductive layer 15/the third transparent conductive layer 23) of the embodiment. As shown in FIG. 5B and FIG. 5C, the full MTIO film (i.e. the first transparent conductive layer 13) and the patterned TITO film (i.e. the second transparent conductive layer 15 functioning as the pixel electrode PE) have different patterns. For example, the coverage area of the full MTIO film is smaller than the coverage area of the patterned TITO film, and the electrode overlapping area 3E (i.e. the area containing three electrodes in the pixel region PX) of the second and first transparent conductive layers can be arranged in the middle section of the pixel region PX. The difference between the configurations of FIG. 5B and FIG. 5C is the electrical connection of the electrode overlapping area 3E and the pixel electrode PE. In FIG. 5B, the electrode overlapping area 3E and the pixel electrode PE are electrically connected to the same data line DL. In FIG. 5C, the electrode overlapping area 3E and the pixel electrode PE are electrically connected to the different data lines (i.e. the first data line DL1 and the second data line DL2), respectively.

Figure 6:
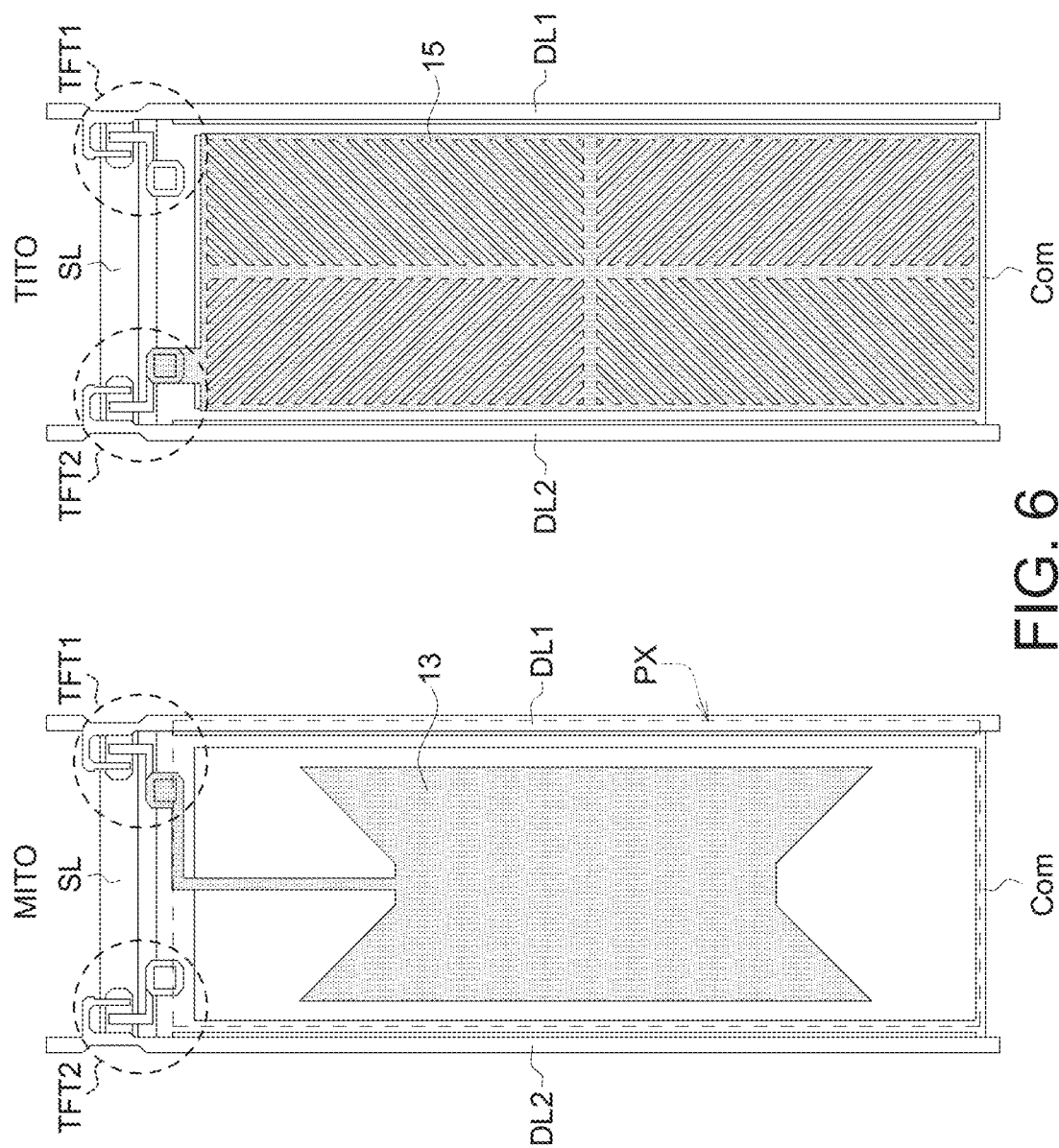
FIG. 6 depicts the top views of an MITO pattern and a TITO pattern in a single pixel region of a display panel according to the second embodiment of the disclosure.

FIG. 6 depicts the top views of an MTIO pattern and a TITO pattern in a single pixel region of a display panel according to the second embodiment of the disclosure, wherein the pixel region is controlled by two data lines (i.e. the first data line DL1 and the second data line DL2). As shown in FIG. 6, the full MTIO film (i.e. the first transparent conductive layer 13) is positioned in the middle section of the pixel region PX, and the area of the full MTIO film is smaller than the area of the patterned TITO film (i.e. the second transparent conductive layer 15), wherein the full MTIO film is electrically connected to the first transistor TFT1. The patterned TITO film with slits is electrically connected to the second transistor TFT2. Additionally, there is no limitation to the shape of the full MTIO film. The full MTIO film can be formed in a butterfly-like shape (and the extending directions of the sides are the same as the extending directions of the slits of the patterned TITO film) as shown in FIG. 6, and also can be formed in a hexagonal shape, a rectangular shape or other applicable shapes. The disclosure has no particularly limitation thereto.

Figure 7:
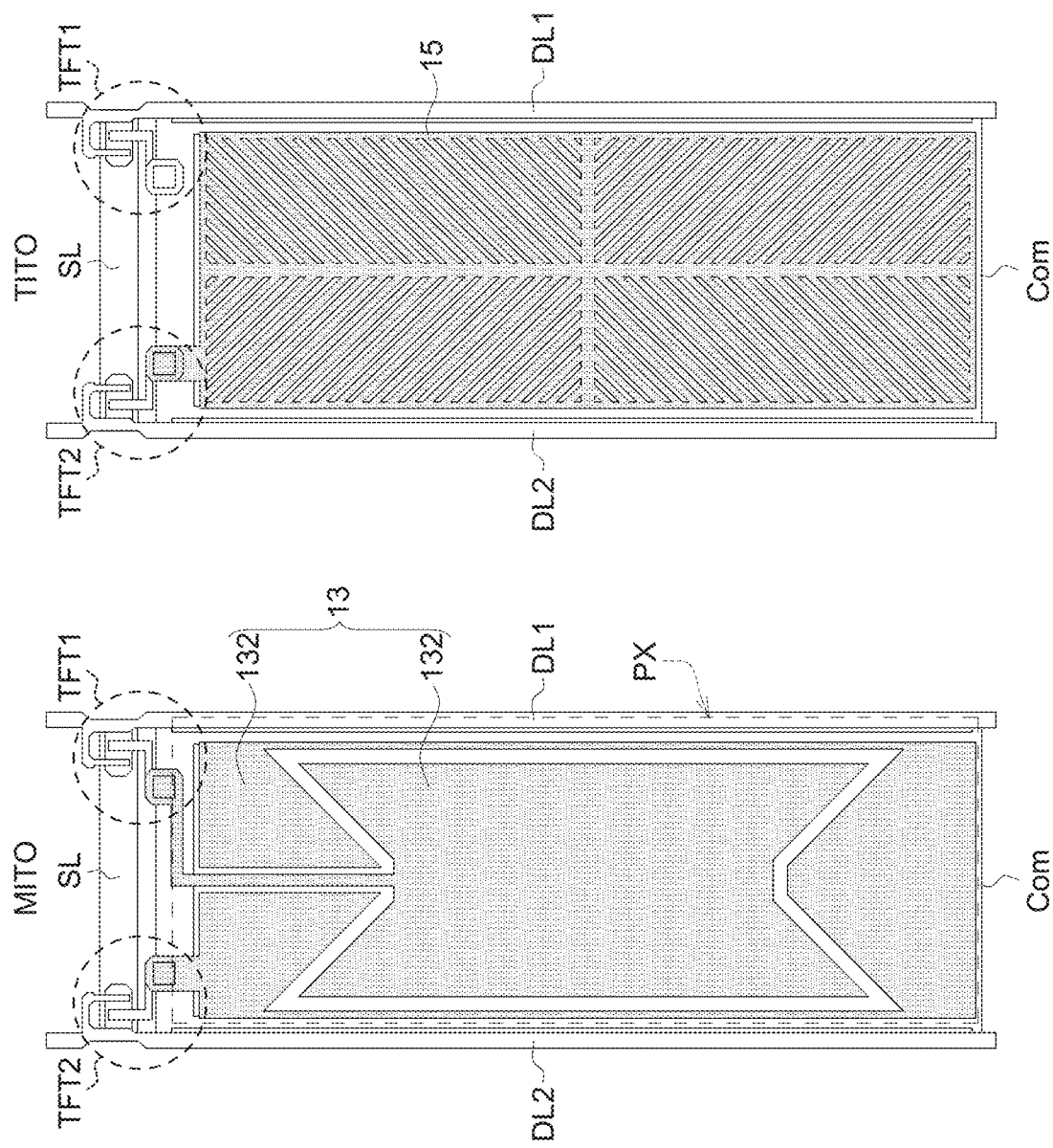
FIG. 7 depicts the top views of an MITO pattern and a TITO pattern in a single pixel region of another display panel according to the second embodiment of the disclosure.

FIG. 7 depicts the top views of an MTIO pattern and a TITO pattern in a single pixel region of another display panel according to the second embodiment of the disclosure. In FIG. 7, the pixel region is still controlled by two data lines (i.e. the first data line DL1 and the second data line DL2). As shown in FIG. 7, the full MTIO film (i.e. the first transparent conductive layer 13) comprises a first full section 131 and a second full section 132 isolated from each other, and the second full section 132 surrounds the first full section 131. Also, the first full section 131 and the second full section 132 are respectively coupled to the first transistor TFT1 and the second transistor TFT2 of the pixel region. In one embodiment, the sum of the areas of the first full section 131 and the second full section 132 can be close to the area of the pixel region PX. The patterned TITO film with plural slits (i.e. the second transparent conductive layer 15) is electrically connected to the second transistor TFT2. Accordingly, both the second full section 132 of the full MTIO film and the patterned TITO film with plural slits are electrically connected to the second transistor TFT2. According to the design as shown in FIG. 7, the first full section 131 and the second full section 132 of the full MTIO film are independently controlled.

Figure 8:
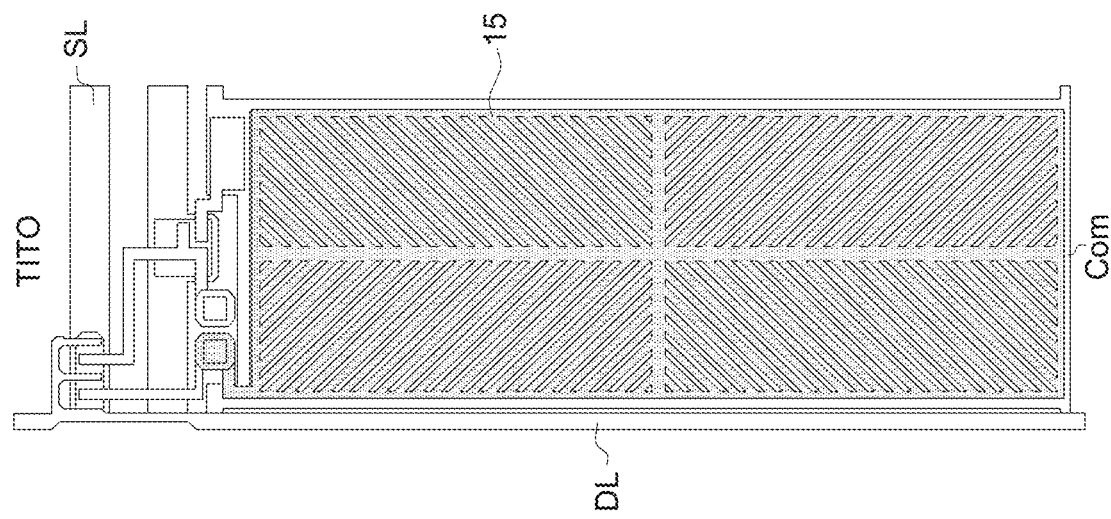
FIG. 8 depicts the top views of an MITO pattern and a TITO pattern in a single pixel region of a further display panel according to the second embodiment of the disclosure.
Figure 8:
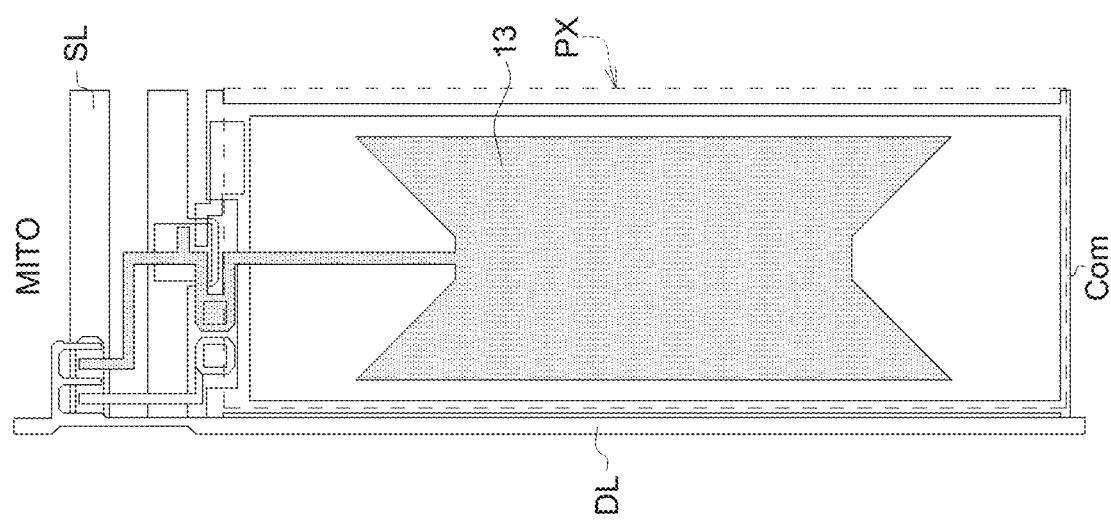

FIG. 8 depicts the top views of an MTIO pattern and a TITO pattern in a single pixel region of a further display panel according to the second embodiment of the disclosure. Different from the designs of FIG. 6 and FIG. 7 (i.e. the pixel region is controlled by two data lines), the design as shown in FIG. 8 exemplifies the pixel region being controlled by one data line. The full MTIO film and the patterned TITO film above can still be applied with the different voltages by configuring the special design of the trace pattern and the contacts, as shown in FIG. 8.

During operation of the display panel, the full MITO film (i.e. the first transparent conductive layer 13) and the patterned TITO film (i.e. the second transparent conductive layer 15) can be applied with the different voltages to form the dark region and the bright region. Alternatively, the full MITO film and the patterned TITO film can be applied with the same voltage, and the dark region and the bright region can still be formed by adjusting the area ratio of the electrode overlapping area 3E to the pixel electrode PE. In one embodiment, the first transparent conductive layer (ex: the full MITO film) is applied with the voltage of $V_{MITO}$, and the second transparent conductive layer (ex: the patterned TITO film) is applied with the voltage of $V_{TITO}$, wherein the voltage difference can be in a range of $0 \leq |V_{MITO} - V_{TITO}| \leq 4$.

Compared to the convention LCS mode LCD panel, the electrode design of the second embodiment possesses several advantages, such as enlarging the active area, improving the transmittance, increasing the production yield and providing stable display quality. Also, according to the electrode design of the second embodiment, the full MITO film and the patterned TITO film above can be independently controlled, which is applicable in the LCS mode LCD panel by forming a bright region and a dark region in each pixel region for compensating the color shifting when the display panel is viewed from the side.

Figure 9:
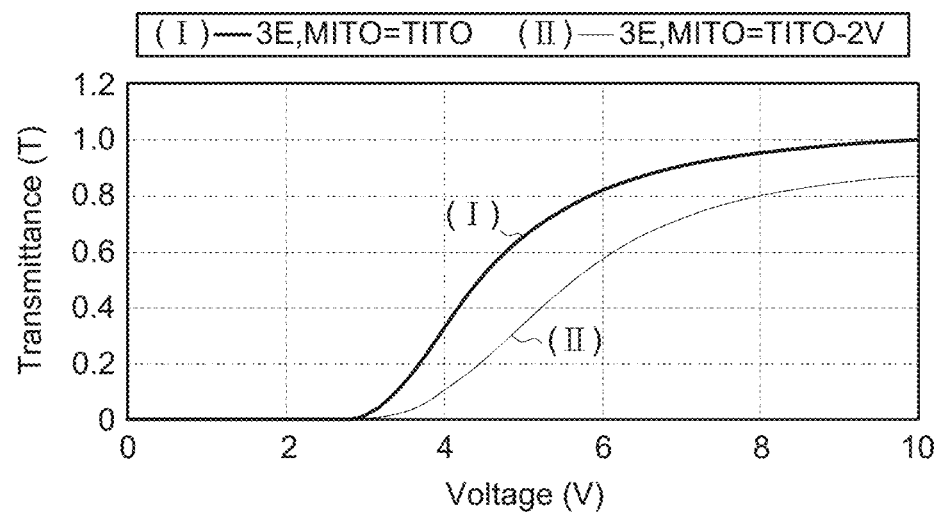
FIG. 9 shows the V-T (voltage-transmittance) curves of the full MITO film and the patterned TITO film in two simulation conditions.

FIG. 9 shows the V-T (voltage-transmittance) curves of the full MITO film and the patterned TITO film in two simulation conditions. Curve (I) represents the simulation result in the condition of same voltage applied to the full MITO film and the patterned TITO film. Curve (II) represents the simulation result in the condition of different voltage applied to the full MITO film and the patterned TITO film, wherein the voltage applied to the full MITO film is equal to the voltage applied to the patterned TITO film minus 2V. The simulation results dearly show that curve (I) is different from curve (II). In the first embodiment, the full MITO film and the patterned TITO film have the same voltage since they are electrically connected to each other, and the electrode design of the first embodiment achieves the high transmittance. In the second embodiment, the full MITO film and the patterned TITO film are independently controlled, and the transmittance may be dropped with the increase of the voltage difference between the full MITO film and the patterned TITO film, due to the existence of the horizontal electric field there between. In the practical application, the transmittance of the pixel region can be controlled, by observing the V-T curves as shown in FIG. 9 to obtain the tendency of the transmittance varied with the voltage applied to the full MITO film.

Third Embodiment

Figure 10:
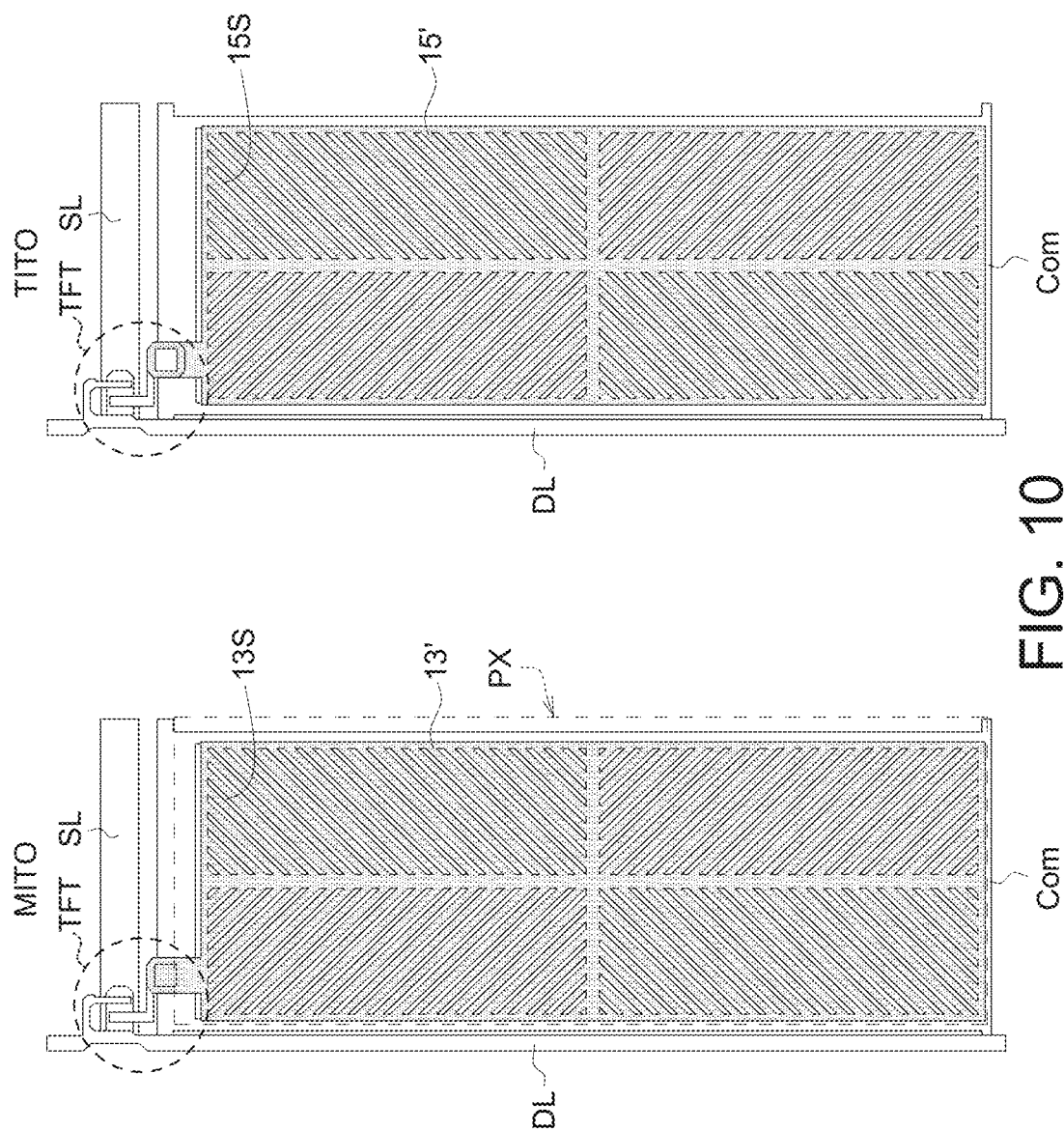
FIG. 10 depicts the top views of an MITO pattern and a TITO pattern in a single pixel region of a display panel according to the third embodiment of the disclosure.

In the first and second embodiments, the full MITO film is exemplified for illustrating the electrode design. However, the disclosure is not limited thereto. The MITO film positioned below the patterned TITO film (i.e. the second transparent conductive layer 15) can be a patterned ITO film with plural slits. FIG. 10 depicts the top views of an MITO pattern and a TITO pattern in a single pixel region of a display panel according to the third embodiment of the disclosure. As shown in FIG. 10, the first transparent conductive layer 13' has several first slits 13S, the second transparent conductive layer 15' has several second slits 15S, and the positions of the first slits 13S are staggered from the positions of the second slits 15S. Also, the extending directions of the first slits 13S are identical to the extending directions of the second slits 15S.

According to the aforementioned descriptions, the three-electrode design of the embodiment (i.e. the first transparent conductive layer 13/the second transparent conductive layer 15/the third transparent conductive layer 23) does increase the intensity of the vertical electric field and the orientation force in the vertical direction upon the LC molecules, thereby increasing the transmittance of the pixel region. Compared to the conventional PSVA or LCS mode display panel, the process variations have no considerable effects on the transmittance of the three-electrode design of the embodiment, and the display quality is stable. Accordingly, the production yield of the display panel manufactured by the three-electrode design of the embodiment can be increased. Moreover, the display panel manufactured by the three-electrode design of the embodiment still can meet the general requirements (such as high aperture ratio) of the application products, and the manufacture of electrode design of the embodiment is highly compatible with the current processes. Thus, the design of the embodiment is suitable for mass production.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a first substrate, comprising:
   a first base plate;
   scan lines and data lines, formed on the first base plate and intersected each other, wherein two of the adjacent scan lines and two of the adjacent data lines define a pixel region, and the pixel region comprising:
   a first transparent conductive layer formed on the first base plate, wherein the first transparent conductive layer is a full film without a slit in the pixel region;
   an insulating layer formed on the first transparent conductive layer; and
   a second transparent conductive layer formed on the insulating layer, wherein the first transparent conductive layer is applied with a voltage of $V_{MITO}$, and the second transparent conductive layer is applied with a voltage of $V_{TITO}$ during operation of the display panel, and $0 \leq |V_{MITO} - V_{TITO}| \leq 4$;
   a second substrate, opposite to the first substrate, and the second substrate comprising a second base plate and a third transparent conductive layer formed on the second base plate; and
   wherein a length of the first transparent conductive layer along an extending direction of the data line is smaller than a length of the second transparent conductive layer along the extending direction of the data line;
   wherein an area on the first base plate covered by the first transparent conductive layer is smaller than an area on the first base plate covered by the second transparent conductive layer;

a liquid crystal layer, positioned between the first substrate and the second substrate.

2. The display panel according to claim 1, wherein a first vertical electric field is generated between the first transparent conductive layer and the third transparent conductive layer, and a second vertical electric field is generated between the second transparent conductive layer and the third transparent conductive layer during operation of the display panel.

3. The display panel according to claim 1, wherein the second transparent conductive layer is a patterned film.

4. The display panel according to claim 3, wherein a coverage area of the first transparent conductive layer is substantially equal to a coverage area of the second transparent conductive layer.

5. The display panel according to claim 1, wherein the first transparent conductive layer and the second transparent conductive layer have different patterns.

6. The display panel according to claim 5, wherein a coverage area of the first transparent conductive layer is smaller than a coverage area of the second transparent conductive layer.

7. The display panel according to claim 1, wherein the first transparent conductive layer is electrically connected to the second transparent conductive layer.

8. The display panel according to claim 1, wherein the first transparent conductive layer and the second transparent conductive layer are independently controlled.

9. The display panel according to claim 8, wherein the first transparent conductive layer is electrically connected to a first transistor of said pixel region, and the second transparent conductive layer is electrically connected to a second transistor of said pixel region.

10. The display panel according to claim 8, wherein the first transparent conductive layer and the second transparent conductive layer are respectively applied with different voltages during operation of the display panel.

11. The display panel according to claim 1, wherein the insulating layer has a thickness in a range of 1000 Å to 4000 Å.

12. The display panel according to claim 1, wherein the insulating layer has a thickness in a range of 1500 Å to 2500 Å.

* * * * *